United States Patent [19]

Rittler

[11] 4,336,303

[45] Jun. 22, 1982

[54] INTEGRAL VITREOUS ARTICLE COMPOSED OF OPAQUE AND TRANSPARENT PORTIONS

[75] Inventor: Hermann L. Rittler, Corning, N.Y.
[73] Assignee: Corning Glass Works, Corning, N.Y.
[21] Appl. No.: 103,414
[22] Filed: Dec. 13, 1979
[51] Int. Cl.³ .......................... B32B 9/00; B32B 17/00
[52] U.S. Cl. .................................... 428/334; 428/426; 428/428; 65/33; 501/18; 501/68
[58] Field of Search ..................... 106/54, 52; 428/426, 428/334, 428; 65/33

[56] References Cited

U.S. PATENT DOCUMENTS

| | | | |
|---|---|---|---|
| 2,683,666 | 7/1954 | Duncan et al. | 106/52 |
| 2,691,855 | 10/1954 | Armistead | 106/52 |
| 3,493,355 | 2/1970 | Wu | 65/30 |
| 3,709,705 | 1/1973 | Hagerdon | 106/54 |
| 3,741,861 | 6/1973 | Andrieu | 428/410 |
| 4,000,998 | 1/1977 | Rittler | 65/33 |

*Primary Examiner*—George F. Lesmes
*Assistant Examiner*—E. Rollins Buffalow
*Attorney, Agent, or Firm*—Clinton S. Janes, Jr.

[57] ABSTRACT

There is disclosed an integral vitreous article composed of an opaque portion encased within a thin surface layer of transparent, colored glass. The article has a uniform chemical composition of an alkaline aluminosilicate nature, the opaque portion contains light scattering particles of a titaniferous nature, and the surface layer contains a titania coupled colorant. The article may be produced by simultaneously forming an article and quenching its surface whereby differential heat extraction produces the transparent surface layer.

14 Claims, 4 Drawing Figures

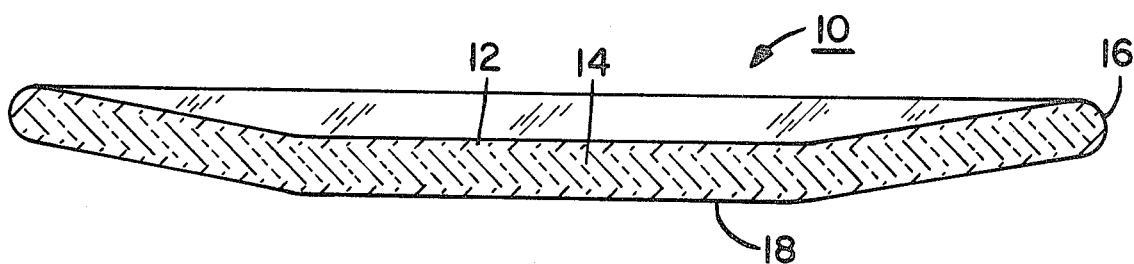
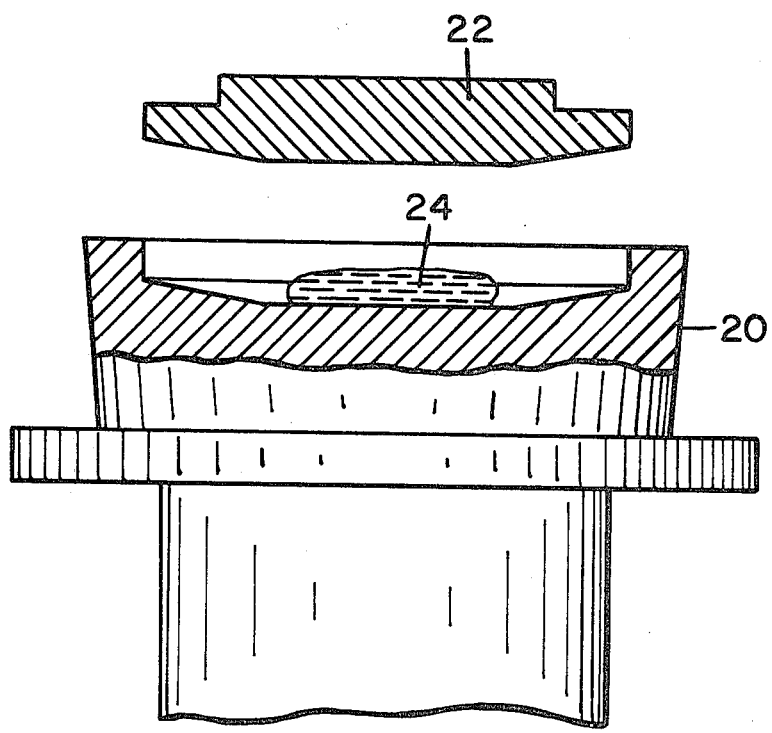

INTEGRAL VITREOUS ARTICLE COMPOSED OF OPAQUE AND TRANSPARENT PORTIONS

RELATED APPLICATIONS

Ser. No. 103,415, filed of even date herewith in the names of J. Ference, J. E. Megles and myself and entitled "Glass Article Having a Pattern Formed in Its Surface and Method", is concerned with production of an opal pattern in the transparent surface layer on articles which may otherwise be in accordance with the present application.

My application, Ser. No. 103,413, filed of even date herewith and entitled "Borosilicate, Opal Glass Article and Method", is concerned with an article similar to that described herein, but of a borosilicate nature and opacified in a different manner.

BACKGROUND OF THE INVENTION

The invention relates to an integral vitreous article composed of an opaque portion encased within a thin surface layer of transparent glass containing a titania-coupled colorant. The opaque portion contains light scattering particles or crystals and may be in the nature of either an opacified glass or a spontaneously-formed glass-ceramic. A specific embodiment of the invention is a pressed dinner plate having a transparent edge. The invention further relates to a method of making an article by simultaneously molding and surface quenching a mass of suitable molten glass.

A glass may be opacified by dispersing therein particles of such a nature that visible light is scattered or diffused, rather than directly transmitted. In general, the ability of a particle to scatter light, and thus impart opacity, depends on the degree of difference between the refractive indices of the particle and the glass, particle size, and particle concentration. Commonly, opacifying particles may be a few thousand Angstrom units in diameter and constitute no more than about 10% of the glass volume.

Spontaneously-formed glass-ceramics are characterized by the separation of a crystal phase from a glass as it cools, that is, without the further heat treatment normally required for the separation of such crystal phase. Further information on spontaneous glass-ceramics and their formation is found in U.S. Pat. No. 3,985,532 (Grossman), No. 3,985,533 (Grossman), and No. 4,000,998 (Rittler).

The role of glass colorants, such as the oxides of nickel, iron, cobalt, chromium and maganese, and the colored glasses thus produced, has been the subject of much patent and other technical literature. A comprehensive reference on the subject is the monograph "Coloured Glasses" by W. A. Weyl, reprinted in 1959 by Dawson's of Pall Mall (London). It has been recognized that the known glass colorants may produce a different color effect in glass-ceramics, that is, nucleated and crystallized glasses. Typical United States patents describing color effects in glass-ceramic materials are U.S. Pat. No. 3,788,865 (Babcock et al.) and my earlier U.S. Pat. No. 4,009,042.

PURPOSES OF THE INVENTION

One purpose of the invention is to provide a unique vitreous article composed of an opaque body portion within a thin skin or surface layer of transparent, colored glass. A further purpose is to achieve unique color effects, simulating earthenware or stoneware, in a molded glass or glass-ceramic article. Another purpose is to provide a family of low viscosity, alkaline, aluminosilicate glasses from which the article of the invention may be produced. Still another purpose is to provide a method of producing the article of the invention by pressing a charge of molten glass.

PRIOR ART

In addition to the literature already mentioned, attention is directed to these technical developments and patents illustrative thereof:

A clear glassy layer may be formed on an opal glass or glass-ceramic article by subsequent heat treatment of the article, as disclosed by U.S. Pat. No. 3,486,963 (Smith), by chemically treating the surface of the article with boric oxide vapors, as disclosed in U.S. Pat. No. 3,493,355 (Wu) and U.S. Pat. No. 3,653,862 (Lynch), or by ion exchange in the surface, as disclosed in U.S. Pat. No. 3,764,444 (Simmons).

Glass may be opacified by precipitated titania, as illustrated by U.S. Pat. No. 2,691,855 (Armistead). The patent discloses that a thermometer tube opal glass containing 8-25% $TiO_2$ is opacified by the reheating action of applying a molten backing glass over the opal glass. At least 8% $TiO_2$ is required to achieve opacity. The use of $TiO_2$ as a glass-ceramic nucleant is disclosed in U.S. Pat. No. 2,920,971 (Stookey), and the possibility of developing a rutile crystal phase in glass-ceramics is disclosed in numerous patents.

The use of titania, in conjunction with other oxides, as a glass colorant is disclosed, for example, in U.S. Pat. Nos. 2,683,666 (Duncan), 2,321,987 (Brown), and 2,965,503 (Hagedorn et al.).

SUMMARY OF THE INVENTION

The article of the invention is an integral vitreous article composed of an opaque portion encased within a thin surface layer of transparent glass, the vitreous article having a uniform elemental composition of an alkaline aluminosilicate nature throughout its mass, the opaque portion containing light scattering particles of a titaniferous nature, and the surface layer being a continuous, unbroken, glass skin containing, as a colorant, titania coupled with a metal oxide, a noble metal, or a mixture thereof, as a coupling agent. The essential chemical components of the article, in terms of oxides and in addition to the color couple, are titania, silica, alumina, and at least one alkali or alkaline earth metal oxide. In general, the composition will include, in percent by weight, at least 10%, but not over 30%, titania ($TiO_2$), at least 40%, but not over 65%, silica ($SiO_2$), at least 3%, but not over 20%, alumina ($Al_2O_3$), and up to 20% of at least one alkaline oxide ($R_2O + RO$).

The article may be produced by melting a glass consisting essentially of titania, alumina, silica, a titania coupler, and at least one alkali or alkaline earth metal oxide, the glass being capable of having a titaniferous material spontaneously separated as an opal or crystal phase, delivering the glass to a forming surface, and extracting heat at a sufficiently rapid rate to form an opaque body having a continuous, unbroken, transparent glass surface layer while forming the glass.

DESCRIPTION OF THE DRAWING

The invention is further described with reference to the attached drawing wherein:

FIG. 1 is a cross section view of a dinner plate molded in accordance with the invention;

FIG. 2 illustrates, schematically, pressing of such a plate;

GENERAL DESCRIPTION

Figure 3:
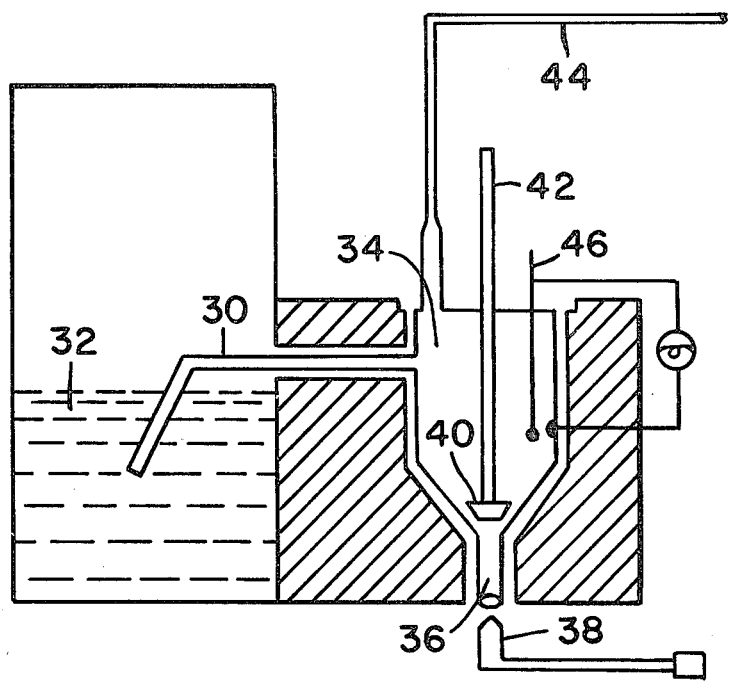
FIG. 3 illustrates, schematically, a method of delivering molten glass for the pressing step of FIG. 2.

FIG. 1 illustrates the invention as a pressed dinner plate 10 of conventional circular form and having a thin skin or surface layer 12 of clear glass encasing an opaque interior portion 14. As illustrated, plate 10 has a thin edge section 16 composed entirely of clear glass. In contrast, body portion 18 of plate 10 appears opaque through surface layer 12 due to opacified interior 14.

A key feature of the invention, then, is selective development of opacity in a glass article by controlled heat extraction. Thus, surface layer 12 is rapidly chilled or quenched to prevent particle growth, while interior portion 14 is cooled less rapidly, thus permitting growth of opacifying particles. In accordance with the method aspect of the invention, this is achieved in conjunction with molding of an article against a forming surface, such as a conventional glass press, or sheet glass roll, or other suitable former.

FIG. 2 schematically illustrates a glass pressing process wherein glass plate 10 is pressed from a gob of molten glass 24 by the combined action of mold 20 and pressing plunger 22. Initially, glass gob 24 is delivered to mold 20 from a reservoir of molten glass. Then, either plunger 22 or mold 20 is vertically moved relative to the other to force molten glass gob 24 into a defined space between the respective pressing surfaces of mold 20 and plunger 22. As is well known, these pressing tools are so designed and machined as to provide a space corresponding to the desired plate shape intermediate their pressing surfaces.

The pressing surfaces of mold 20 and plunger 22 are suitably cooled to extract heat rapidly from the surface of plate 10 as it is molded. Sufficiently rapid heat extraction insures that any potentially opacifying particles formed in the surface layer do not grow to opacifying size before the glass becomes too viscous to permit further particle growth. Thus, the surface or skin of the glass remains clear and transparent, that is, it does not diffuse or scatter visible light. The clear surface layer thus formed may be seen as a thin layer 12 in cross-section which forms a clear edge 16 on the plate.

In contrast, the interior portion 14 of the glass cools more slowly, that is, heat is extracted less rapidly. As a result, potentially opacifying particles can and do grow to opacifying size, whereby this interior becomes opaque. Consequently, a color contrast is apparent between transparent glass as viewed through edge 16 and as viewed against body portion 18.

In order to produce a clear glass layer of appreciable depth, the glass surface must be cooled very rapidly by quenching from the molten condition. The thickness of the clear glass layer thus formed will increase as the rate of heat extraction, that is, the quench rate, increases. Normally, this thickness will not exceed ten (10) mils (~250 microns) and is usually about five (5) mils (~125 microns). The essential requirement, of course, is a continuous, unbroken skin which might be as thin as several microns.

Those skilled in the glass art will appreciate that the rate of heat extraction may be changed in various ways. Thus, the molding surfaces may be cooled by interior circulation of water in the mold and/or plunger members. Alternatively, cooling fluid, either liquid or gaseous, may be applied directly to the molding surfaces. Also, the mold metals employed may be selectively chosen to effect a greater or lesser rate of heat transfer. Furthermore, it will be appreciated that the principles and practices, here described with reference to glass pressing and the forming surfaces on press elements, are equally applicable to other glass formers and their forming surfaces, such as sheet glass rolls.

The invention has thus far been considered with reference to opal glasses and the development of opacifying particles in such glasses. The same considerations apply to spontaneously formed glass-ceramics where crystal size is the controlling factor. The growth of crystallized glass also depends on the rapidity with which heat is extracted from the molten glass during the forming operation. In this case, the crystallized glass in the clear surface skin does not effectively scatter light. In contrast, greater crystal growth and larger size crystals occur in the interior portion of the article due to the slower cooling rate. The crystal size then becomes sufficiently great that light is scattered and the material appears visibly opaque.

The feature of differential growth in opacifying particles or crystals, which characterizes the invention, has been observed only in titanium silicate-type glasses. Thus, a suitable glass must contain at least about 10% $TiO_2$ in order to permit the formation of opacifying particles or the spontaneous separation of a crystal phase containing titania as the glass is quenched. With contents above about 30% $TiO_2$, glass formation becomes difficult to achieve and no benefits have been found to accrue.

Glasses suitable for present purposes generally may be considered as alkaline aluminosilicates, primarily in the nepheline and feldspar composition systems. Thus, in addition to titania, and the coupler associated therewith for color, the glasses will essentially consist of silica, alumina and at least one alkaline oxide of the alkali metal oxide group ($R_2O$) and/or the alkaline earth metal oxide group (RO).

Silica ($SiO_2$) is the primary glass forming oxide, and a content, in percent by weight, of at least 40% is required for that purpose. Effective separation of opacifying particles normally requires a silica content that does not exceed about 65%. Boric oxide ($B_2O_3$) may be present in amounts up to about 10% to facilitate melting. However, its use must be restricted because of a generally adverse effect on chemical durability.

At least one metal oxide of an alkaline nature, normally selected from the oxides known as alkali metal oxides ($R_2O$) and alkaline earth metal oxides (RO), is present as a glass modifying oxide, and more than one may be present if desired. These oxides facilitate melting, as is well known, and may be selected and/or adjusted to modify such properties as coefficient of thermal expansion and viscosity-temperature characteristics. Soda ($Na_2O$) is normally used because of flux power and ready availability, but may be replaced in part at least by potash ($K_2O$) and/or lithia ($Li_2O$). For some purposes an alkaline earth metal oxide may be desired. In this case, lime (CaO) or magnesia (MgO) are usually selected, although baria (BaO) and strontia (SrO) are also available. The oxide(s) selected and the amount will depend on the prescribed properties to be attained. However, the total content should not exceed 20% and is preferably 8–15%.

Alumina (Al$_2$O$_3$) acts to stabilize a glass and impart chemical durability. Thus, at least 3%, and preferably on the order of 8–15%, Al$_2$O$_3$ is employed in the present glasses. Larger amounts, particularly in the absence of substantial alkaline oxides, tend to make the glass hard to melt, and amounts greater than 20% should be avoided. Also, Al$_2$O$_3$ appears to impede opal formation, and, as its content increases, increasing amounts of TiO$_2$ are required to provide equivalent opal forming capacity.

Zirconia (ZrO$_2$) may be desirable to stabilize a glass and improve its durability. In general, this oxide tends to raise the melting temperature, and its content should not exceed about 5%. When added, it may be considered as a substitute for titania with respect to glass physical properties other than opacification and color formation.

The present glasses are generally characterized by a very high liquidus temperature, in general over 1200° C., and very low viscosity at the liquidus, frequently below 2000 poises. Also, these glasses have a steep viscosity curve, especially in the normal glass molding temperature range. Hence, normal glass delivery systems are often ineffective. As described in detail later, special vacuum feeding apparatus and techniques may be used in delivering the glasses for forming.

At the same time, the glasses do melt easily and lend themselves to rapid forming when successfully delivered to the forming equipment.

Another characteristic feature of the invention is the formation of unusual color effects in the present materials when titania couples with other metal oxides and/or noble metals. Particularly interesting effects are achieved when the transition metal oxides are coupled with titania.

As the author Weyl points out in his monograph, supra, fully oxidized titania does not act as a colorant, at least in small amounts. However, it is an easily reduced oxide and, when so reduced, may impart a yellow color. Also, its tendency to shift oxidation levels may alter the effects produced by other colorants.

In the present materials, titania appears capable of functioning either to produce opacity or to produce color in the absence of opacity. While the exact nature of the various effects is not fully understood, it appears that the differential particle size is a major factor, that is, the color in the clear skin glass is occasioned by materials which are too small to produce opacity by light scattering, but are sufficiently large to produce color effects. In any event, the invention produces an unusual effect of a clear, colored glass overlay on an opaque interior or body portion of an article.

Titania couples with virtually all other oxides, except those of Groups I and II elements in the Periodic Table, to produce color effects. It is particularly effective with normal colorant oxides including the oxides of vanadium, cerium, niobium, molybdenum, tungsten, manganese, iron, cobalt, nickel, chromium, copper, cadmium, selenium, tellurium, neodymium and praeseodymium. The content of such oxide couplers is not critical, except with respect to color control. In general, the content may range from about 0.01%, in the case of a strong colorant such as cobalt oxide, to 5%, in the case of an oxide such as manganese dioxide.

Titania also couples with the noble metals to provide further unusual color effects. Again, content of the noble metal is not critical, but color may vary in a given glass with variance in metal content. The effective content of the metals is generally substantially less than that of the oxides, varying from about 0.001% by weight up to about 1%. Larger amounts, while sometimes tolerable, generally serve no useful purpose.

The opal particles may be titania alone, e.g., anatase, brookite or rutile crystals, or may take a variety of spinel forms.

The general features and parameters of the invention having been set forth and described to the extent practical, the invention is further described with reference to specific illustrative embodiments.

SPECIFIC EMBODIMENTS

TABLE I below sets forth, in percent by weight as calculated from the batch on an oxide basis, the compositions of several glasses found useful in practicing the invention.

TABLE I

|  | 1 | 2 | 3 | 4 | 5 | 6 | 7 | 8 | 9 |
|---|---|---|---|---|---|---|---|---|---|
| SiO$_2$ | 61 | 61 | 61.8 | 52 | 52.4 | 49 | 57.5 | 51.5 | 53.5 |
| Al$_2$O$_3$ | 9 | 9 | 8.9 | 10 | 14.9 | 10 | 8 | 10.5 | 10.9 |
| B$_2$O$_3$ | — | — | — | — | — | — | 10 | 8.1 | 4.8 |
| TiO$_2$ | 18 | 13 | 12.9 | 25 | 19.8 | 25 | 15.5 | 20.4 | 21.1 |
| ZrO$_2$ | 2 | 2 | 1.9 | — | — | — | 5 | — | — |
| Na$_2$O | 2 | 2 | 1.9 | 10 | 9.9 | 10 | 8 | 8.5 | 8.8 |
| K$_2$O | 1.5 | 1.5 | 1.4 | — | — | — | — | — | — |
| CaO | 4 | 4 | 3.8 | — | — | — | — | — | — |
| MgO | 2 | 2 | 1.9 | — | — | — | — | — | — |
| FeO | — | 5 | 5.0 | — | — | — | — | — | — |
| CeO$_2$ | 0.5 | 0.5 | 0.5 | 3 | 3 | — | — | — | — |
| As$_2$O$_5$ | — | — | — | — | — | 1 | 1 | 1.0 | 0.9 |

Table II sets forth a variety of different properties measured on glasses having the calculated compositions shown in Table I. Two pound batches, based on the several compositions, were mixed, ballmilled to improve batch homogeneity, and then melted in silica crucibles at 1600° C. for 16 hours to produce the glasses. Test samples in various forms were taken from the melt, and properties measured, or observed, as indicated in Table II.

Glass durability was determined by immersing a glass sample in a 0.3% solution of Super Soilax ® detergent at 95° C. for a given length of time. The sample was then removed and the surface rated for residual appearance, change of color, and loss of gloss. An "A" rating indicates a clean surface free of residue when rinsed; change of color and change of gloss are serially recorded with "0" indicating no apparent change and "1" a barely perceptible change. A readily noticeable change is rated "2". The number under the rating numbers is the test duration in hours, thus 112 hours for Examples 6 and 7.

"Liq." (liquidus) indicates the temperature at which glass crystallization occurs on standing, and "Liq. Vis." indicates the glass viscosity at the liquidus temperature. These values, together with the steepness of the full viscosity-temperature curve, determine glass delivery conditions.

"Exp." refers to the coefficient of thermal expansion over the range zero to 300° C., with the value given being multiplied by $10^{-7}$ for the actual value per degree C. "Ann." and "St. Point" indicate the well known viscosity-temperature values, annealing point and strain point.

TABLE II

| | 1 | 2 | 3 | 4 | 5 | 6 | 7 | 8 | 9 |
|---|---|---|---|---|---|---|---|---|---|
| DD | A00 96 | A00 96 | — | A00 96 | A00 96 | A00 112 | A02 112 | A00 142 | — |
| Appearance | Grayish blue | Blue-black | Blue-beige | Cordovan-brown | Brown-beige | Cream | Ivory-yellow | Yellow-beige | Brown |
| Crystal Phase | Anatase | — | — | Brookite | — | Anatase | — | — | — |
| Liq. | — | — | 1330 | — | — | 1350 | — | 1440 | 1370 |
| Liq. Vis. | — | — | 3400 | — | — | — | — | 500 | 1600 |
| Exp. | — | — | 47 | — | 76 | 68 | — | 68 | — |
| Ann. | — | — | 753 | 670 | 747 | — | — | 574 | 611 |
| St. Point | — | — | 705 | 620 | 695 | — | — | 532 | 560 |

In order to illustrate the variable color effects attained with titania coupled to other oxides, a typical glass in the nepheline system, composed of, by weight, 60% $SiO_2$, 10% $Al_2O_3$, 20% $TiO_2$ and 10% $Na_2O$, was selected as a base glass. A series of batches was formulated in which an effective amount of color coupler was substituted for silica on a weight percent basis. Thus, the addition of 1% coupler reduced the silica content to 59% and left other oxide contents unchanged.

Two pound batches, based on the several compositions, were mixed, ballmilled to improve batch homogeneity, and then melted in silica crucibles held at 1600° C. for 16 hours. Each melt was poured into a press mold and pressed into a ten inch diameter dinner plate. Table III records the color observed in the main body of the dish (the opacified portion) and in the rim (transparent).

TABLE III

| Oxide Additive | Amount % by Wt. | Rim Color | Body Color |
|---|---|---|---|
| NiO | 0.5 | Green | Mottled green |
| $V_2O_5$ | 0.5 | Black | Cordovan plum |
| NiO + $V_2O_5$ | 1.0 + 0.1 | Amber brown | Pea green |
| $MnO_2$ | 5.0 | Gray | Lavender plum |
| $Cr_2O_3$ | 2.0 | Yellow | Brown |
| CoO | 0.1 | Green | Greenish black |
| CuO | 1.0 | Gray | Lilac |
| $SeO_2$ | 0.5 | Amber | Dark green |
| $TeO_2$ | 0.5 | Dark green | Gray |
| $As_2O_5$ | 1.0 | Ivory | Ivory |
| $Sb_2O_3$ | 1.0 | Green | Gray |
| $SnO_2$ | 3.0 | Green | Green |

A second set of batches was mixed and milled as above. These batches were based on a $CaO$-$TiO_2$-$Al_2O_3$-$SiO_2$ base glass with noble metals being added in minute amounts as titania couplers. The base glass contained, by weight, 60% $SiO_2$, 10% $Al_2O_3$, 20% $TiO_2$ and 10% CaO. The batches were prepared, melted, and pressed into plates, as described for the oxide coupler batches of Table III. The colors observed in the plates are set forth in Table IV.

TABLE IV

| Metal | % by Wt. | Body | Rim |
|---|---|---|---|
| Silver | 0.01 | Blue | Gray |
| Silver | 0.10 | Grayish blue | Gray |
| Gold | 0.01 | Lavender | Ruby |
| Gold | 0.05 | Dark lavender | Dark ruby |
| Platinum | 0.05 | Yellowish blue | Gray |
| Platinum | 0.10 | Grayish blue | Gray |
| Rhodium | 0.05 | Grayish brown | Brown |
| Ruthenium | 0.02 | Black | Brown |

The invention is further illustrated by describing a larger scale method of producing dinner plates from a glass corresponding in composition to Example 6 of Table I.

Commercially available raw materials, including sand, alumina, titania, zirconia, soda ash and arsenic pentoxide, were mixed in suitable proportions to form a glass batch. This batch was melted in a day tank in melts of 400–700 lb. size. The tank was loaded, brought to temperature of 1600° C., and held for about 50 hours. During this time, the melt was stirred by passing oxygen bubbles upward through the melt. The oxygen flow was discontinued before molten glass delivery was initiated, since the oxygen flow could otherwise be a source of gaseous inclusions in the glass.

Like most of the presently useful glasses, the glass melted in this operation had a high opal liquidus (>1200° C.) and a short working range. This made it necessary to deliver the molten glass for forming at a viscosity in the range of 100–200 poises. At such viscosities, the glass is too fluid to permit gathering in the usual manner. The glass could be ladled, but such an operation is difficult to control because of the tendency of the glass to set up rapidly.

Accordingly, the glass was delivered from the melting unit to a forming mold by a vacuum gob delivery system schematically shown in FIG. 3. The system, there illustrated, includes a molten glass delivery tube 30 extending below the surface of the glass melt 32 at one end and into a glass reservoir or bowl 34 at the other end. Delivery tube 30 will normally be platinum or similar noble metal.

Bowl 34 is provided with a delivery orifice 36 through which a controlled amount of glass may be metered to a pressing mold as hereafter described. Orifice 36 was designed to be closed by a removable plug 38 from the outside, or by a cone shaped end 40 on a needle valve 42 from the interior.

Bowl 34 was a closed system having a vacuum line 44 leading to a solenoid controlled arrangement of vents and vacuum ports (not shown), whereby reduced pressure on the order of 2 mm. Hg could readily be established and the system then restored to atmospheric equilibrium. Such an arrangement is well within the skill of the art to establish. It is not described in further detail since it does not represent a feature of the invention.

In operation, pressure in bowl 34 was reduced to about 2 mm. Hg. by opening vacuum line 44 and the vacuum ports associated therewith. This caused molten glass 32 to flow through delivery tube 30 into bowl 34. When the glass level reached a sensing probe 46 at a predetermined level, the solenoid control system was activated to close the vacuum ports and open the vent ports to restore atmospheric pressure. A press mold, such as mold 20 of FIG. 2, was then moved horizontally under delivery orifice 36 to receive glass from bowl 34 by raising needle valve 42. When a predetermined amount of glass was delivered, needle valve 42 was lowered to stop flow.

Mold 20, containing a gob of glass discharged therein from bowl 34, was then moved vertically and a plunger brought into position to press the molten glass to desired shape, in this case a ten-inch diameter plate.

Figure 4:
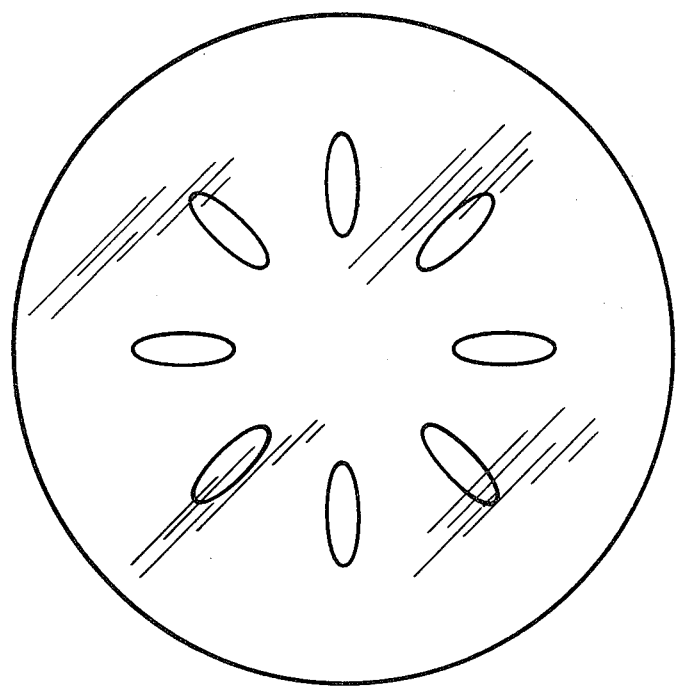
FIG. 4 is a top plan view of a plate similar to FIG. 1, but having a decoration formed within its surface.

A modification of the pressing operation was employed to provide decorated plates. The molten gob was touched with a graphite decorative stamp, that is, a stamp having a desired pattern machined into its glass contacting surface. When the glass gob was then pressed as before, a surface opal pattern corresponding in form to the stamp pattern spontaneously formed in the center of the plate, as illustratively shown in FIG. 4.

A second glass, corresponding to Example 5 in Table I, was melted as above and glass delivered to a press mold by the vacuum delivery system described above. The pressed plates were a cordovan color, except for the rims which were beige in color.

Reference is made to the following United States patents for detailed description of apparatus especially designed for delivery and molding of very low viscosity glasses of the type useful for present purposes.

U.S. Pat. No. 3,533,770 (Adler et al.) describes a system for intermittently feeding discrete charges of low viscosity molten glass at predetermined intervals using air pressure and vacuum as weight control media.

U.S. Pat. No. 3,351,449 (Ambrogi) describes a method of feeding metered charges of low viscosity glass wherein the area of the delivery orifice is so proportioned to the viscosity of the glass that the downstroke of a needle valve will deliver a desired charge, and zero flow is achieved during the upstroke.

U.S. Pat. No. 3,436,202 (Andrysiak) describes an apparatus for press-forming glass articles from low viscosity glass by indexing a plunger above a mold member into which a charge of glass has been deposited, and then raising the mold into pressing engagement with the plunger.

While the invention has been illustratively described with reference to various specific methods of operation, it should be appreciated that practice of the invention is not necessarily limited to these techniques and equipment. In particular, it is contemplated that, physical properties permitting, a glass may be formed by means other than gob pressing. For example, a glass sheet may be rolled for use as such, or for the molding of articles from the sheet in known manner. Also, other means of delivery, such as ladling or even gathering, may be employed with at least some of the glasses, depending on viscosity characteristics.

I claim:

1. An integral vitreous article composed of an opaque portion encased within a thin, continuous, unbroken surface layer of transparent colored glass, the vitreous article having a uniform elemental composition throughout its mass consisting essentially of at least one alkali metal oxide and/or alkaline earth metal oxide, $Al_2O_3$, $SiO_2$, $TiO_2$, and, as a titania color coupler, A $TiO_2$-coupling agent selected from the group of a noble metal, a metal oxide other than an element from Groups I and II of the Periodic Table, and mixtures thereof, the opaque portion containing light scattering particles of a titaniferous nature.

2. A vitreous article in accordance with claim 1 wherein the composition, calculated from the glass batch on an oxide basis in weight percent, consists essentially of 40–65% $SiO_2$, 10–30% $TiO_2$, 3–20% $Al_2O_3$, up to 5% of said $TiO_2$-coupling agent, and up to 20% of at least one alkali metal oxide and/or alkaline earth metal oxide.

3. A vitreous article in accordance with claim 2 wherein the composition additionally contains up to 10% $B_2O_3$.

4. A vitreous article in accordance with claim 2 wherein the composition additionally contains up to 5% $ZrO_2$, the total $TiO_2$ plus $ZrO_2$ being 15–30%.

5. A vitreous article in accordance with claim 2 wherein the composition is in the nepheline system and contains up to 20% $Na_2O$ as the alkali metal oxide.

6. A vitreous article in accordance with claim 2 wherein the composition is composed essentially of 49–61% $SiO_2$, 8–15% $Al_2O_3$, 2–10% $Na_2O$, 1–25% $TiO_2$, 8–10% of at least one alkali metal oxide and/or alkaline earth metal oxide, and up to 5% of said $TiO_2$-coupling agent.

7. A vitreous article in accordance with claim 6 composed of 49% $SiO_2$, 10% $Al_2O_3$, 25% $TiO_2$, 10% $Na_2O$, 1% $As_2O_5$ and 5% $ZrO_2$.

8. A vitreous article in accordance with claim 1 wherein the opaque portion is opacified by titaniferous particles.

9. A vitreous article in accordance with claim 8 wherein the opaque portion is a glass containing opacifying particles.

10. A vitreous article in accordance with claim 8 wherein the opaque portion is a instant glass-ceramic containing crystals.

11. A vitreous article in accordance with claim 1 wherein the transparent glass surface layer is not over ten mils thick.

12. A vitreous article in accordance with claim 11 wherein the transparent glass surface layer is on the order of five mils thick.

13. A vitreous article in accordance with claim 1 wherein the titania is color coupled to a metal oxide selected from the group of arsenic, vanadium, cerium, niobium, molybdenum, tungsten, manganese, iron, cobalt, nickel, chromium, copper, cadmium, selenium, tellurium, neodymium, and praeseodymium.

14. A vitreous article in accordance with claim 1 wherein the noble metal is silver.

* * * * *

UNITED STATES PATENT AND TRADEMARK OFFICE
CERTIFICATE OF CORRECTION

PATENT NO. : 4,336,303
DATED : June 22, 1982
INVENTOR(S) : Hermann L. Rittler

It is certified that error appears in the above-identified patent and that said Letters Patent are hereby corrected as shown below:

Column 6, line 28, in the line beginning "$TiO_2$", place "25" appearing between the columns labeled "3" and "4" under column "4" and move all subsequent numbers over one column.

Column 10, line 2, change "A" to -- a --.

Column 10, line 26, change "1-25%" to -- 12-25% --.

Column 10, line 40, change "a" to -- an --.

Signed and Sealed this

Twenth-eighth Day of September 1982

[SEAL]

Attest:

GERALD J. MOSSINGHOFF

Attesting Officer     Commissioner of Patents and Trademarks